United States Patent [19]
Di Rosa

[11] Patent Number: 5,876,172
[45] Date of Patent: Mar. 2, 1999

[54] HIGH-CAPACITY INTEGRATED DEPOTS FOR CONTAINERS

[75] Inventor: Gaetano Di Rosa, Turin, Italy

[73] Assignee: Fata Automation S.p.A., Turin, Italy

[21] Appl. No.: 728,211

[22] Filed: Oct. 10, 1996

[30] Foreign Application Priority Data

Oct. 13, 1995 [IT] Italy .................................. MI95A2104

[51] Int. Cl.⁶ .................................................. B65G 63/00
[52] U.S. Cl. .................................... 414/139.9; 414/140.3; 414/141.3; 414/399; 414/392; 414/283
[58] Field of Search ...................................... 414/281, 269, 414/273, 277, 280, 282, 283, 286, 137.1, 139.4, 139.9, 140.3, 140.8, 141.3, 399, 390, 391, 392; 254/2 R

[56] References Cited

U.S. PATENT DOCUMENTS

| | | | |
|---|---|---|---|
| 1,373,464 | 4/1921 | Titcomb | 414/141.3 X |
| 3,091,188 | 5/1963 | Graham | 414/139.9 X |
| 3,543,952 | 12/1970 | Yang | 414/140.3 |
| 3,559,822 | 2/1971 | Lichtenford et al. | 414/140.3 |
| 3,631,993 | 1/1972 | Young | 414/140.3 X |
| 5,511,923 | 4/1996 | Dunstan | 414/139.9 |

*Primary Examiner*—Frank E. Werner
*Attorney, Agent, or Firm*—Jacobson, Price, Holman & Stern, PLLC

[57] ABSTRACT

An integrated container depot (10) comprises a first transit sector (11) with a cellular structure (13) having cells superimposed and adjacent to one another to form columns and rows of cells designed to receive containers; a second storage sector (12) consisting of a storage yard structure with areas for stacking containers; first devices (14, 18) for transferring containers to and from a container arrival and departure area (19) and cells of the cellular structure (13); second devices (15, 16, 17) for transferring containers to and from cells of the cellular structure (13) and areas of the storage yard structure, (12). Upon arrival of containers they are rapidly inserted into the cellular structure, from where they are extracted in a desired order for efficient stacking in the storage yard structure.

5 Claims, 3 Drawing Sheets

HIGH-CAPACITY INTEGRATED DEPOTS FOR CONTAINERS

BACKGROUND OF THE INVENTION

This invention refers to an innovative structure for the orderly disposition and storage of containers.

In the known technique, the problem of receiving, arranging, storing and shipping large quantities of containers is well known. For example, in ports, loading and unloading containerships is a long and tedious operation and very often creates serious logistic problems. In fact, it is preferable for the loading and unloading of the ship to be carried out within the shortest time possible. The order in which the containers are unloaded hardly ever coincides with the order in which the various containers must be withdrawn from the receiving structure and vice versa, both as regards withdrawal times and as regards the means of transport (by road, rail, etc.) Attempting to at least partially rearrange the containers while unloading them however results in a considerable slowing down of the unloading operations.

One of the container storage structures suitable for large and very large quantities is the classical storage yard, where the containers are stacked up while waiting to be shipped to their final destination. The use of a storage yard as a depot is useful in order to reduce the structuring required for the warehouse and in order to optimize the space occupied and the cost of handling and equipment.

However, stacking up containers leads to the disadvantage of making it extremely difficult to withdraw and discharge a particular container if it is not at the top of its respective stack. In storage yard depots it is consequently imperative to rearrange the containers.

This, however, considerably slows down the operations of unloading into the depot and tends to reduce the number of containers per stack, resulting in an increase in the size of the storage yard.

In the known technique depots for containers have also been proposed which enable them to be inserted and removed from the depot in a non sequential order. This is achieved by means of complex honey-combed structures, composed of a plurality of cells among which transelevators move to withdraw and insert containers into the cells. In this way it is possible to achieve independence between the order of insertion and the order of withdrawal of the containers into and from the depot.

In modern terminals, the number of containers to be stored is frequently very high (even as many as several thousand containers) and structures of this kind are consequently very difficult to produce, both because of the equipped areas that they have to occupy and because of the lack of efficiency of the handling equipment which would have to travel over very long distances, both vertical and horizontal, within very short spaces or time.

As the number of containers increases, these cellular depots rapidly become uneconomical and somewhat inefficient, especially as far as the travelling lift is concerned.

The general scope of this invention is to obviate the above-mentioned problems by providing a storage structure or integrated depot, which enables the containers to he very rapidly received and efficiently rearranged, and which at the same time enables an extremely large number of containers to be stored at relatively low cost and with limited requirements in terms of handling equipment.

SUMMARY OF THE INVENTION

This scope is achieved, according to the invention, by providing an integrated container depot comprising a first transit sector with a cellular structure having cells superimposed and adjacent to one another to form columns and rows of cells designed to receive containers; a second storage sector consisting of a storage yard structure with areas for stacking containers; first means for transferring containers to and from a container arrival and departure area and cells of the cellular structure; second means for transferring containers to and from cells of the cellular structure and areas of the storage yard structure.

BRIEF DESCRIPTION OF THE DRAWINGS

The innovative principles of this invention and its advantages with respect to the known technique will be more clearly evident from the following description of a possible exemplification and non-restrictive embodiment applying such principles, wit reference to the accompanying drawings, in which.

DETAILED DESCRIPTION OF THE INVENTION

Figure 1:
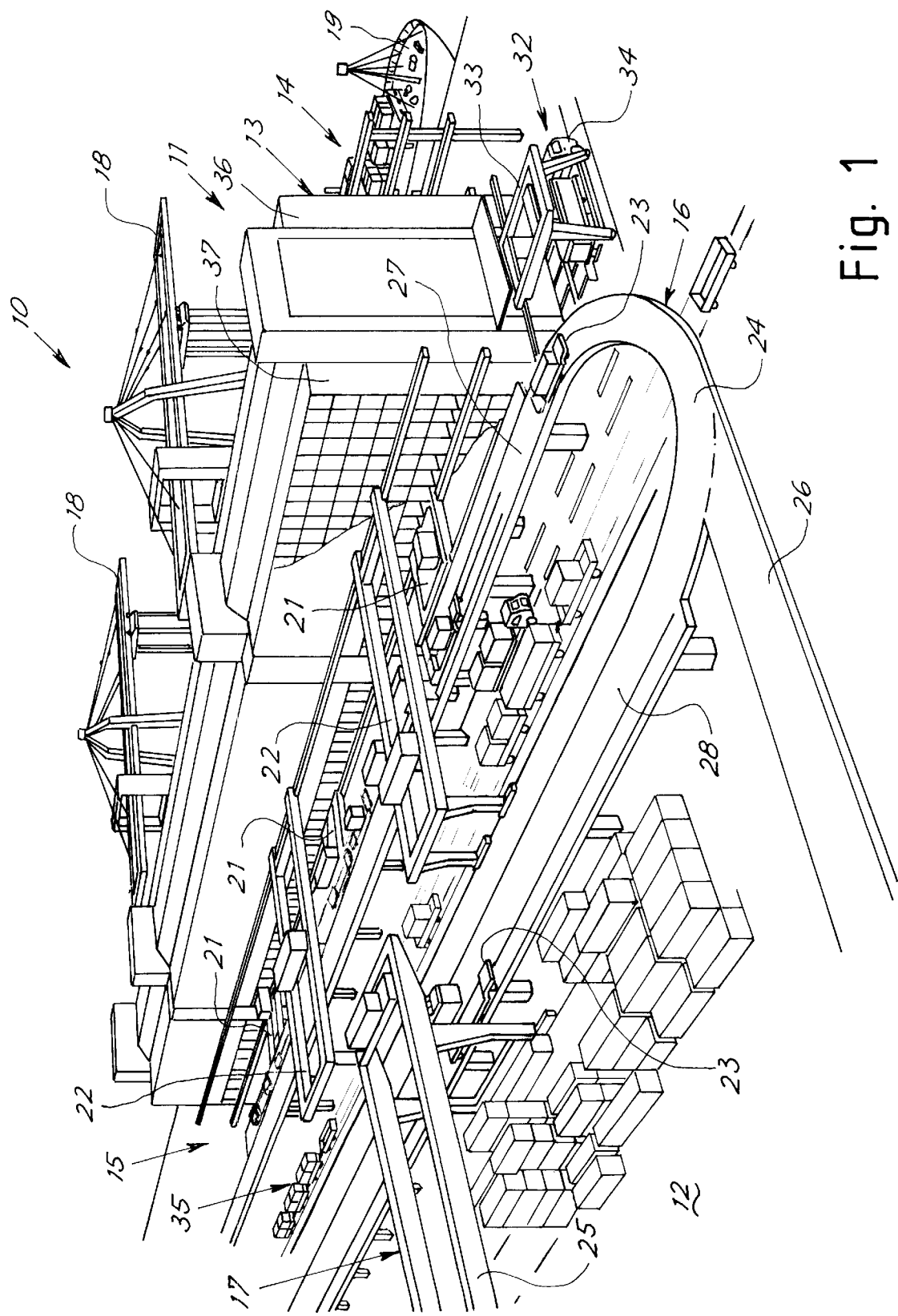
FIG. 1 shows a schematic perspective view of a storage structure according to the invention.

With reference to the figures, a storage structure, generically indicated by reference 10, comprises a first area or sector 11 for transit of containers and a second area or sector 12 for storage of the containers.

The first sector comprises a cellular structure 13 composed of a plurality of cells disposed in rows and columns to form at least one wall of adjacent cells. As can be seen in the figures and as will be explained further on, the walls made of cells are advantageously two in number disposed facing each other.

Disposed between a container arrival and departure area and cells of the cellular structure are first means for transferring containers, while disposed between cells of the cellular structure and areas of the storage yard structure are second means for transferring containers.

In particular, the cellular structure comprises opposing sides or faces on which are disposed means 14, 15 for inserting and withdrawing the containers in it. The means for inserting and withdrawing 15 on one of the two sides are connected, by transferring means 16, to means 17 for handling the containers in the storage yard structure 12.

Typically, the inserting and withdrawing means 14 are means for receiving incoming containers on arrival from outside the depot which must be arranged and stored. As a rule, the side of the cellular structure which is served by the means 14 (that is to say the main communicating side between the integrated depot 10 and the outside or container arrival and departure area) is parallel to a containerships docking wharf 19 and the means 14 are served by quay cranes 18 for unloading (or loading) the containers from the ship.

Figure 2:
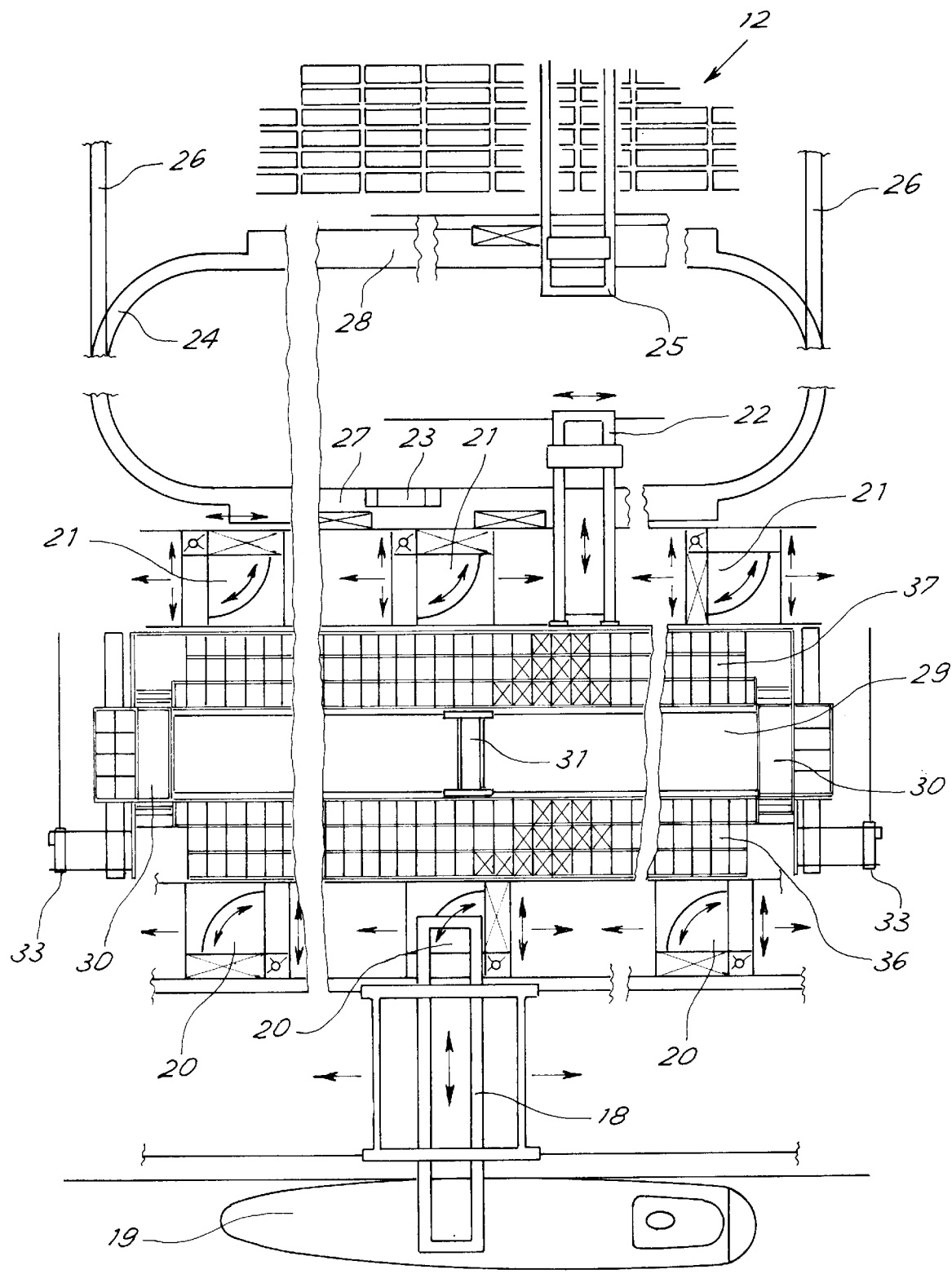
FIG. 2 shows a schematic sectional plan view of the structure of FIG. 1.
Figure 3:
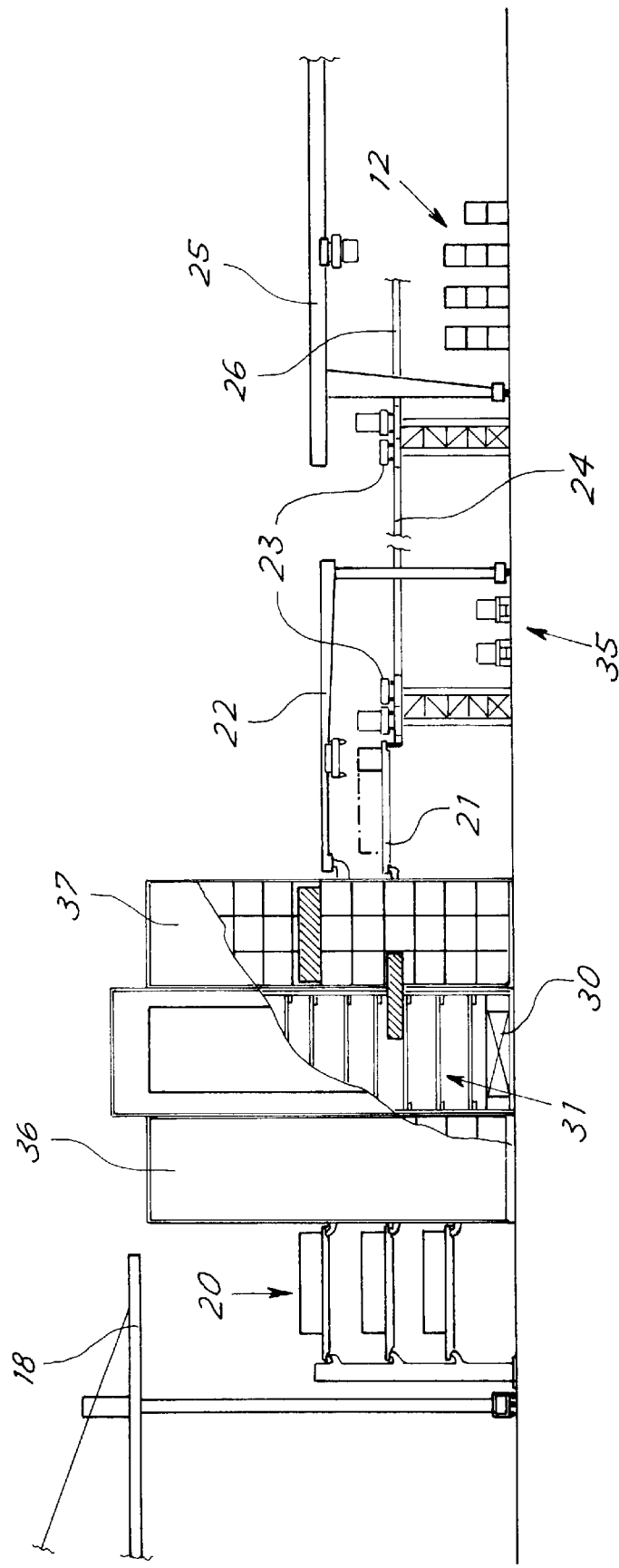
FIG. 3 shows a partial cutaway side view of the structure of FIG. 1.

As can be clearly seen in FIG. 2, the inserting and withdrawing means 14 and 15 comprise a plurality of overhead travelling cranes 20 and 21 respectively, which run horizontally along the two opposing faces of the cellular structure. The overhead travelling cranes 20, 21 can be disposed on a single floor of the cellular structure, so as to run along a single row of cells, or be disposed on several floors. For example, as can be seen in FIG. 3, in the exemplificative embodiment shown here the overhead travelling cranes 20 are disposed on three floors, while the overhead travelling cranes 21 are disposed on one floor only. This enables the containers to be rapidly received from the ship while at the same time limiting the complexity of the structure.

Each overhead travelling crane 20, 21 comprises the function of inserting and withdrawing a container from the cells as well as the function of rotating the container by 90° on itself, so as to withdraw and deposit on itself a container disposed with its longer side parallel to the direction of insertion into the cells. Overhead travelling cranes with a similar functioning capacity are well-known and consequently not further described herein.

The transferring means between the cellular sector and the storage yard sector comprise cranes 22 and automatic shuttles 23 sliding along runways 24. The cranes 22 run along the front of the cellular structure and over the overhead travelling cranes 21 to transfer the containers between the overhead travelling cranes and the automatic shuttles 23.

The cranes 22 can also be of such dimensions as to enable them to unload the containers onto trucks or railway wagons 35, as well as onto the automatic shuttles, whenever, for example, it is required to be able to withdraw the container directly from the depot after the rearrangment carried out in the cellular structure. As can be clearly seen in FIG. 2, the runways comprise an annular path having a first side 27 parallel and close to the overhead travelling cranes and a second side 28 parallel and close to one side of the storage yard structure along which run the handling means 17 which operate in the storage yard. The handling means 17 comprise storage yard cranes 25 which run along the second side of the annular path of the runways to transfer the containers between the shuttles arriving on said second side and the storage yard.

As can be easily imagined by the expert in the field, and consequently not shown in detail, for very large-sized storage yards the annular structure of the runways can be repeated at intervals along the storage yard, each annular structure being connected to the others by means of connecting sections 26. Except for the annular structure closest to the cellular sector, the others will have both their two rectilinear sides served by storage yard cranes to transfer the containers to and from the shuttles 23 and the storage yard.

As can be clearly seen in the figures, the runways can advantageously have sections served by the storage yard cranes and by the cranes 22, made with a double lane or widened with turnouts for handling and overtaking, to allow the shuttles that have to he loaded or unloaded to stop without hindering the circulation of the other shuttles.

With the integrated depot thus made, with a cellular transit area and a final storage yard area it is possible to achieve a high storage speed, with limited costs and minimum mooring time for the containerships. At the same time, the flexibility of the depot is such as to permit precise and efficient arrangement of the incoming containers, and subsequently enable them to be easily retrieved and withdrawn from the depot.

When in operation, the depot receives the containers by means of the cranes 18, which unload the containers from a ship moored at the quayside and deposit them on the overhead travelling cranes 20. The number of cranes and overhead travelling cranes can be easily dimensioned so as to ensure rapid unloading.

As the overhead travelling cranes gradually receive the containers, they shift and stop in front of a free cell, then they rotate the container from the transversal receiving position to the frontal inserting position and insert it in the cell.

While the cells are being filled with the containers that are being unloaded, on the opposite side of the cellular structure the containers are withdrawn by means of the overhead travelling cranes 21. The containers can be withdrawn in any order whatsoever, different from the order in which they were inserted into the cells. In this way, the ship can be unloaded in the order most convenient for rapid unloading, while the containers can be arranged for final storage in any desired different order.

Once a container has been removed from the cellular structure and disposed on a overhead travelling crane 21, the overhead travelling crane rotates the container from the withdrawing position to the hoisting position and one of the cranes 22 transports the container from the overhead travelling crane 21 to a shuttle 23 waiting on section 27 of the runway.

The shuttle transports the container along the runway until it reaches a pre-established position in the storage yard sector of the depot, where a storage yard crane lifts the container and deposits it in a pre-established stack in the storage yard.

It is obvious that in this way it is possible to create stacks in any area whatsoever of the storage yard with any desired order of the containers in the stacks. For example it is thus possible to arrange the containers so that the ones that have to be stored for a shorter period of time are on top of the stacks, or group together in a pre-established area of the storage yard containers intended to be discharged at the same period of time or forwarded to the same destination, etc.

To discharge the stored containers from the storage yard, the nearest storage yard crane withdraws the desired container from the top of the corresponding stack and directs it towards the outside of the integrated depot.

The routes that can be followed by the containers departing from the storage yard can vary. For example, the crane can unload the container directly onto a truck, a railway wagon, etc. waiting at the edge of the storage yard; the crane can unload the container onto a shuttle on the runway 16 which conveys it to a crane 22 which picks it up and unloads it onto a truck, a railway wagon, etc.; the crane can unload the container onto a shuttle on the runway 16 which conveys it to a crane 22 which picks it up and unloads it onto an overhead travelling crane 21 which reinserts it into the cellular structure, from where it can be withdrawn, for example, and sent to a ship waiting at the quayside.

In the example shown and described herein, the complexity of the handling equipment outside the cellular structure has been limited, in particular to be able to use overhead travelling cranes with just a horizontal movement along a single row or floor of the cellular structure or in any case along a number of floors smaller than the number of floors in the cellular structure.

In order to achieve such limitation in complexity, it was found advantageous to create a cellular structure composed, as is clearly visible in FIGS. 2 and 3, of a double wall of cells 36, 37, one facing the overhead travelling cranes 20 and the other facing the overhead travelling cranes 21. Disposed between the two walls is a corridor or gap 29 which remains inside the structure and onto which open ends of the cells look out.

Along the corridor run internal handling means whereby the containers are removed from the cells, brought into the corridor, conveyed along the corridor and inserted into another cell.

In this way, the containers unloaded from the ship can be inserted into the cells in the quay-side wall on the floors served by the overhead travelling cranes 20. Whereupon, the internal handling means remove these same containers from the opposite end of the cells, convey them along the corridor 20 and insert them into different cells (in either one of the two walls), so as to, rapidly free the cells served by the overhead travelling cranes to enable other containers unloaded from the ship to be inserted in them.

The internal conveying means can then withdraw the containers stored in the various cells in any desired order and insert them into the cells facing out onto the overhead travelling cranes 21, so that the overhead travelling cranes 21 can withdraw the containers from the cells facing out onto them and send them to the storage yard for final storage.

FIGS. 2 and 3 show a possible embodiment of the internal conveying means. According to such embodiment, the ends of the corridor 29 and, if necessary, several intermediate positions, are provided with elevators 30 which run vertically between the various floors of the structure for vertically handling the containers. The various floors are also provided with internal overhead travelling cranes 31 which run horizontally along the corridor 29. The overhead travelling cranes 31 comprise trolleys for inserting and removing the containers from the cells which face onto the corridor. To shift a container from one cell or another on a different level, the overhead travelling crane 31 of the level of departure slides along the corridor until it comes face to face with the container to be transferred, takes the container from the cell, transports it to the nearest free elevator, which conveys it to the floor of arrival where an overhead travelling crane 31 of that floor picks it up and conveys it along the corridor until it is facing the cell of arrival and inserts it.

It may he envisaged to differentiate the functions of the various elevators. For example, the pair of end elevators can be used for moving the containers among the various floors to place them in the holding cells, while the intermediate elevator or elevators an be used for conveying the containers from the holding cells to the entrance and exit cells disposed in correspondence with the external overhead travelling cranes 20, 21.

An internal overhead travelling crane can obviously be provided on each floor, or a number of overhead travelling cranes smaller than the number of floors and elevators which convey from one floor to another not only the containers but also the overhead travelling cranes.

The cellular structure can also comprise secondary exits 32 at the ends of the corridor at ground floor. Said exits are served by the corresponding end elevator and can comprise traversing cranes 33 for depositing the containers on trucks 34. Said secondary exits can be exploited to discharge containers directly from the cellular structure.

At this point it will be obvious how the intended scopes have been achieved. The depot according to the invention can be managed completely automatically by means of a processor which, by storing the data on incoming containers, can optimize their handling so as to achieve the best possible stacking arrangement in the storage yard, in order to optimize both the ship unloading time the entrance and exit of the stored containers both towards the land and towards the sea.

The elements such as the handling cranes, the overhead travelling cranes with rotation, the devices for inserting and removing the containers from the cells and the various conveying means as well as the automatic shuttles, are not shown or described herein in greater detail since they are all of substantially known technique and can consequently be easily imagined by the expert in the field.

The foregoing description of an embodiment applying the innovative principles of this invention is obviously given by way of example in order to illustrate such innovative principles and should not therefore be understood as a limitation to the sphere of the invention claimed herein.

For example, the number of cells and handling and conveying means may vary in relation to specific requirements.

What is claimed is:

1. Integrated container depot comprising:
    a first transit sector for receiving containers in a cellular structure having two separated sets of cells, each set of cells including superimposed cells and cells located adjacent to one another to form columns and rows of cells designed to receive containers, each said cell including a floor, a ceiling and two lateral walls, said first transit sector being located adjacent to a wharf for temporarily storing containers to be unloaded from or to be delivered to a ship at the wharf from a first one of said two sets of cells, said first set of cells including overhead travelling cranes for moving containers through said first set of cells,
    a second one of said two sets of cells including overhead travelling cranes for moving containers through said second set of cells,
    an elevator system located between said two sets of cells for transferring containers between said two sets of cells so as to arrange the placement of containers in a predetermined arrangements,
    a second storage sector for receiving containers, said second storage sector including a storage yard structure remote from said second set of cells and having areas for stacking containers in a predetermined sequence,
    first means for transferring containers to and from cells of the first transit sector and the wharf, and
    second means for transferring containers to and from cells in the first transit sector and areas of the storage yard structure in the second storage sectors,
    said second means for transferring including overhead travelling cranes for moving containers to and from the second set of cells and automatic shuttle cars running along runways between the second means for transferring and storage yard cranes for moving containers between the shuttle cars and the storage yard.

2. Depot as claimed in claim 1, wherein first overhead travelling cranes of the first means for transferring comprise means for rotating the containers to and from a position for inserting and removing a container from the first set of cells and a position for transferring containers by means of the first cranes.

3. Depot as claimed in claim 2, wherein second overhead travelling cranes of the second means for transferring comprise means for rotating the containers to and from a position for inserting and removing a container from the second set of cells and a position for transferring containers by means of the second cranes.

4. Depot as claimed in claim 1, wherein the runways comprise at least one annular path, one section of the annular path passing close to the second cranes and another section passing close to the storage yard cranes.

5. Depot as claimed in claim 4, wherein that the first of the two sections is parallel to the rows of cells and the second is parallel to one side of the storage yard.

* * * * *